United States Patent [19]

Hamlin et al.

[11] 4,404,005
[45] Sep. 13, 1983

[54] MOLECULAR SIEVE TYPE GAS SEPARATION SYSTEMS

[75] Inventors: Humphrey A. S. Hamlin, Montacute, near Yeovil; James C. Taylor, Yeovil, both of England

[73] Assignee: Normalair-Garrett (Holdings) Limited, Yeovil, England

[21] Appl. No.: 294,004

[22] Filed: Aug. 18, 1981

[30] Foreign Application Priority Data

Aug. 18, 1980 [GB] United Kingdom ............... 8026843

[51] Int. Cl.³ .............................................. B01D 53/04
[52] U.S. Cl. ........................................ 55/163; 55/179; 55/389
[58] Field of Search ............... 55/18, 20, 21, 161–163, 55/179, 180, 389

[56] References Cited

U.S. PATENT DOCUMENTS

| 3,880,616 | 4/1975 | Myers et al. ............ 55/162 X |
| 3,922,149 | 11/1975 | Ruder et al. ............ 55/21 |
| 4,101,298 | 7/1978 | Myers et al. ............ 55/179 X |
| 4,197,095 | 4/1980 | White, Jr. et al. ............ 55/21 X |
| 4,247,311 | 1/1981 | Seibert et al. ............ 55/162 |
| 4,272,265 | 6/1981 | Snyder ............ 55/161 X |
| 4,315,759 | 2/1982 | Benkmann ............ 55/18 |
| 4,322,223 | 3/1982 | Christel, Jr. ............ 55/18 |
| 4,322,228 | 3/1982 | Myers et al. ............ 55/163 |

FOREIGN PATENT DOCUMENTS 2003742 3/1979 United Kingdom ............ 55/18
2029257 3/1980 United Kingdom .

Primary Examiner—Robert H. Spitzer
Attorney, Agent, or Firm—Larson and Taylor

[57] ABSTRACT

A molecular sieve type gas separation system capable of delivering a product gas of controlled variable composition and being especially useful for the production of oxygen-enriched air as breathable gas for aircrew, has an apparatus for controlling the regeneration of the or each sieve bed so as to achieve delivery of the product gas with a constituent concentration which is variably selectable within a predetermined range of values.

5 Claims, 3 Drawing Figures

MOLECULAR SIEVE TYPE GAS SEPARATION SYSTEMS

BACKGROUND OF THE INVENTION (1) Field of the Invention

THIS INVENTION relates to gas separation systems utilising molecular sieves and is especially but not exclusively connected with the employment of such systems in the aviation field for obtaining oxygen-enriched air as a breathable gas for aircrew.

(2) Description of the Prior Art

In a gas separation system utilising molecular sieves, a feed gas mixture is caused to flow through a bed of molecular sieve material having the capability of retaining unwanted constituent(s) of the gas mixture while passing the wanted constituent(s): for instance, in the separation of oxygen from air a molecular sieve material type 5A as is available, for example, from BEYER A.G. or UNION CARBIDE CORPORATION may be used to hold back nitrogen and to pass oxygen to provide a delivery of a product gas that is approximately 95% oxygen. In the operation of such a system, the sieve material becomes progressively saturated with the retained gas constituent(s), e.g. nitrogen, and eventually becomes incapable of retaining further amounts of such constituent(s). The sieve material of the bed, therefore, has to be regenerated from time to time to purge it of the retained constituent(s). Typically regeneration is effected by flushing the bed, usually in the reverse direction, with the product gas while the outflow from the bed is discharged, e.g., to atmosphere.

To provide for continuous delivery of the desired product gas, the system may include a reservoir for this and from which product gas is drawn for flushing the bed for regeneration purposes. Additionally or alternatively, the system may include a plurality of beds arranged to be utilised and regenerated in an overlapping sequence to provide for continuous delivery of a required product gas.

A common manner of operating a gas separation system employing one or more molecular sieve beds involves charging the or each bed with feed gas mixture—e.g. air—under pressure and continuing the feed to the bed to maintain the charge pressure during delivery of the required product gas constituent(s) to use or storage. When the bed approaches saturation, the feed is discontinued and the bed vented to release the charge pressure, whereafter the bed is purged. For convenience, a system operated in this manner is referred to herein as a "pressure sieving gas separation system."

In aircraft applications it is normally required that the oxygen concentration (partial pressure) in the breathable gas supplied to aircrew shall be related to cabin altitude, i.e. to the ambient pressure obtaining within their enclosure.

Hitherto in proposed aircraft applications of molecular sieve type gas separation systems, such systems have been treated as a source of substantially pure oxygen to be utilised in the manner traditional in aircrew breathable gas suppy systems: that is to say, the substantially pure oxygen product gas delivered by the separation system is proposed to be diluted with air to provide a breathable gas mixture of the required oxygen partial pressure, in a manner analogous to the utilisation of the oxygen obtained from sources such as high pressure storage bottles and liquid oxygen converters.

The utilisation of a product gas that is substantially pure oxygen for producing oxygen-enriched air as breathable gas involves the use of appropriate mixing valves and related control devices to derive the desired breathable gas mixture. Such valves and control devices tend to be heavy and to be potentially unreliable through their inclusion of capsules and the like for sensing ambient pressure changes.

SUMMARY OF THE INVENTION

It is an object of the present invention to provide a simple and effective molecular sieve type gas separation system capable of delivering a product gas of controlled variable composition and that is especially useful for the production of oxygen-enriched air as breathable gas for aircrew.

According to the present invention, a molecular sieve type gas separation system is characterised by means controlling the regeneration of the or each sieve bed to achieve the delivery of a product gas having a constituent concentration variably selected within a predetermined range of values.

In the application of the invention to the production of breathable gas for aircrew, a gas separation system with appropriate control of sieve regeneration in accordance with the invention may directly produce breathable gas with an oxygen partial pressure selected, in accordance with requirements, within a wide range of values.

The invention is especially applicable to a pressure sieving gas separation system as above defined, the means controlling the regeneration of the bed or beds thereof comprising suitable control means governing the sequential operation of feed, vent, purge and other valves in response to demand signals including signals derived from means monitoring the composition of the delivered product gas.

While the invention may be applied to a system having a single sieve bed associated with product gas storage, it is especially applicable to multi-bed systems.

The control means may conveniently comprise a microprocessor that enables the control of regeneration of the sieve bed(s) to be managed in response to a number of signals so as to meet requirements for change in product gas composition in response to individual variations in a number of sensed conditions. For instance, in aircraft applications, breathable product gas composition can be adjusted to meet aircrew requirements in various operational modes, not only taking account of normal aircraft operating conditions but also responding to abnormal, e.g. emergency, conditions.

In the case of a system in accordance with the invention adapted for the production of a gas mixture characterised by a controllably variable oxygen content, such as the breathable gas mixture required for aircrew, the product gas composition may conveniently be monitored by a sensor directly responsive to the partial pressure of oxygen in the product gas.

DESCRIPTION OF THE PREFERRED EMBODIMENTS

Figure 1:
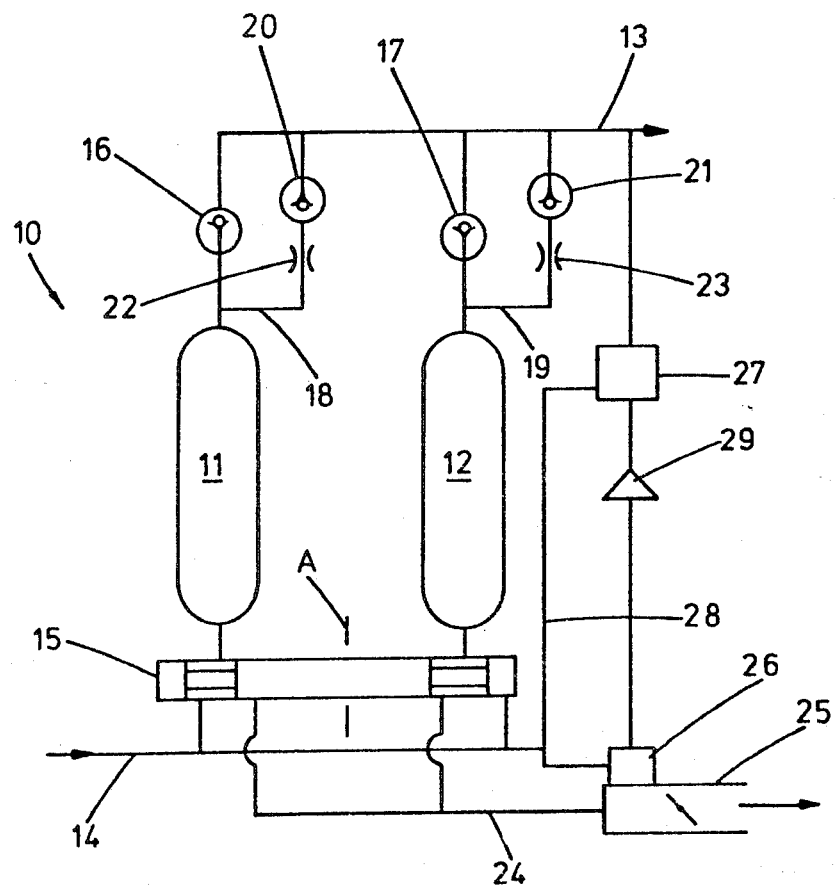
FIG. 1 is a schematic representation of an embodiment of a pressure sieving gas separation system in accordance with the invention and utilising two sieve beds.

In the embodiment illustrated in FIG. 1, a pressure sieving gas separation system 10 comprises two molecular sieve beds 11, 12 suitably contained and arranged to deliver product gas towards a delivery line 13.

For convenience of description it will be assumed that the sieve beds 11, 12 are of the said molecular sieve material type 5A appropriate to retaining nitrogen while passing oxygen from compressed air supplied to the bed from a supply line 14 under the control of valve means 15. The product gas delivered to line 13 is thus oxygen-enriched air having an oxygen concentration (partial pressure) determined by the operation of the system as will be explained.

The sieve beds 11, 12 are connected to the delivery line 13 via non-return valves 16, 17 respectively. The non-return valve 16 is bridged by a flushing loop 18 comprising a non-return valve 20 upstream of a flow-regulating orifice 22, whereas the non-return valve 17 is bridged by a flushing loop 19 comprising a non-return valve 21 upstream of a flow-regulating orifice 23.

The valve means 15 in this embodiment is a combination valve arranged to control both the admission of supply air to the beds 11, 12 and also the vent flow from the beds 11, 12, to a vent line 24, during regeneration. The valve means 15 may be a spool valve or it may be a rotary valve arranged for rotation about a spindle as indicated at A in the drawing.

The vent line 24 extends to a control valve 25 for controlling the flow through the line 24. While this control valve 25 is shown as a simple butterfly valve it is preferably a valve providing for a constant rate of regulation of the flow therethrough as the valve moves between a fully-open position and a closed position. The valve 25 is associated with a pneumatic actuator 26, powered by pressurised air drawn from the supply line 14 and responsive to command signals generated by a flueric oxygen partial pressure sensor 27 arranged to monitor the product gas in the delivery line 13. A duct 28 connects the supply line 14 to the sensor 27 to provide a reference source for the partial presure sensor. The output of sensor 27 is amplified by a flueric amplifier 29 for application to the actuator 26.

The flueric oxygen partial pressure sensor 27 may conveniently comprise a flueric bridge partial pressure sensor (not shown) constructed in accordance with our co-pending United States Patent application Ser. No. 243499 filed Mar. 13th, 1981. This sensor has two bridge legs adapted for sensing a reference gas, in this case the air being supplied to the molecular sieve beds 11 and 12 from the supply line 14, and a sample gas mixture, that is, the product gas, oxygen-enriched air, flowing in the delivery line 13. The sensor is arranged to provide a constant pressure output signal for a predetermined constant partial pressure of oxygen in the product gas.

In operation of the illustrated embodiment as above described, a desired concentration (partial pressure) of oxygen in the product gas, such as to provide, say, the equivalent of air at an altitude of 5000 feet, is maintained by control of the regeneration of the molecular sieve beds.

In this connection it should be noted that in the operation of a sieve bed such as one of the beds 11 and 12, optimum separation efficiency is obtained when the bed is first brought on-stream, in a fully-flushed, nitrogen-free, condition. As the bed becomes progressively saturated with retained nitrogen, its separating efficiency declines.

Hitherto such a molecular sieve bed has been cyclically placed on-stream and under regeneration in accordance with a schedule that provides for full flushing of the bed material at each regeneration, and its subsequent retention on-stream only for so long as it is delivering oxygen of the maximum practical purity: that is to say, full regeneration is routinely effected before the separating ability of the bed material has significantly declined as a result of nitrogen saturation.

In contradistinction, in the system in accordance with the invention, the bed is continually operated in a partially saturated condition so as to deliver air enriched with oxygen to a desired oxygen partial pressure. This is accomplished by restricting the flushing of the bed so as not fully to cleanse the latter at each regeneration.

In the illustrated embodiment, the beds 11 and 12 are placed on-stream and regenerated in alternating sequence by the operation of the control valve 15 but the vent flow through the vent line 24 from the bed being regenerated at any one time is restricted by the control valve 25, the setting of which is responsive to the partial pressure sensor 27 monitoring the partial pressure of oxygen in the discharge line 13. Thus if the oxygen partial pressure in line 13 tends to rise beyond the value required, the output of the sensor 27 is applied by the amplifier 29 to the actuator 26 so as to close the valve 25 and thus restrict flushing of the bed being regenerated so as thereby to cause that bed, when next on-stream, to deliver gas of reduced oxygen partial pressure as a result of the bed material being partially saturated with nitrogen through less than complete flushing. Conversely, if the oxygen partial pressure in line 13 tends to decrease, the valve 25 is opened to enhance the flushing of the sieve bed then under regeneration so as to enable that bed when next on-stream to deliver gas of higher oxygen partial pressure.

The control means comprising the sensor 27 and the valve 25 may thus be arranged to maintain in the line 13 a product gas delivery of average oxygen partial pressure of chosen value within a range.

The control means may be associated with sensors providing outputs significant of other conditions, arranged to modify the setting of the valve 25 so as to adjust, as may be required, the product gas oxygen partial pressure within the available range of values for this.

The embodiment illustrated in FIG. 1 comprises only two sieve beds, 11 and 12, respectively, but it will be apparent that a larger number of beds could be interposed between the supply line 14 and the delivery line 13, with suitable duplication or adaptation of the control valve 15 for effecting sequential regeneration of the individual beds.

Figure 2:
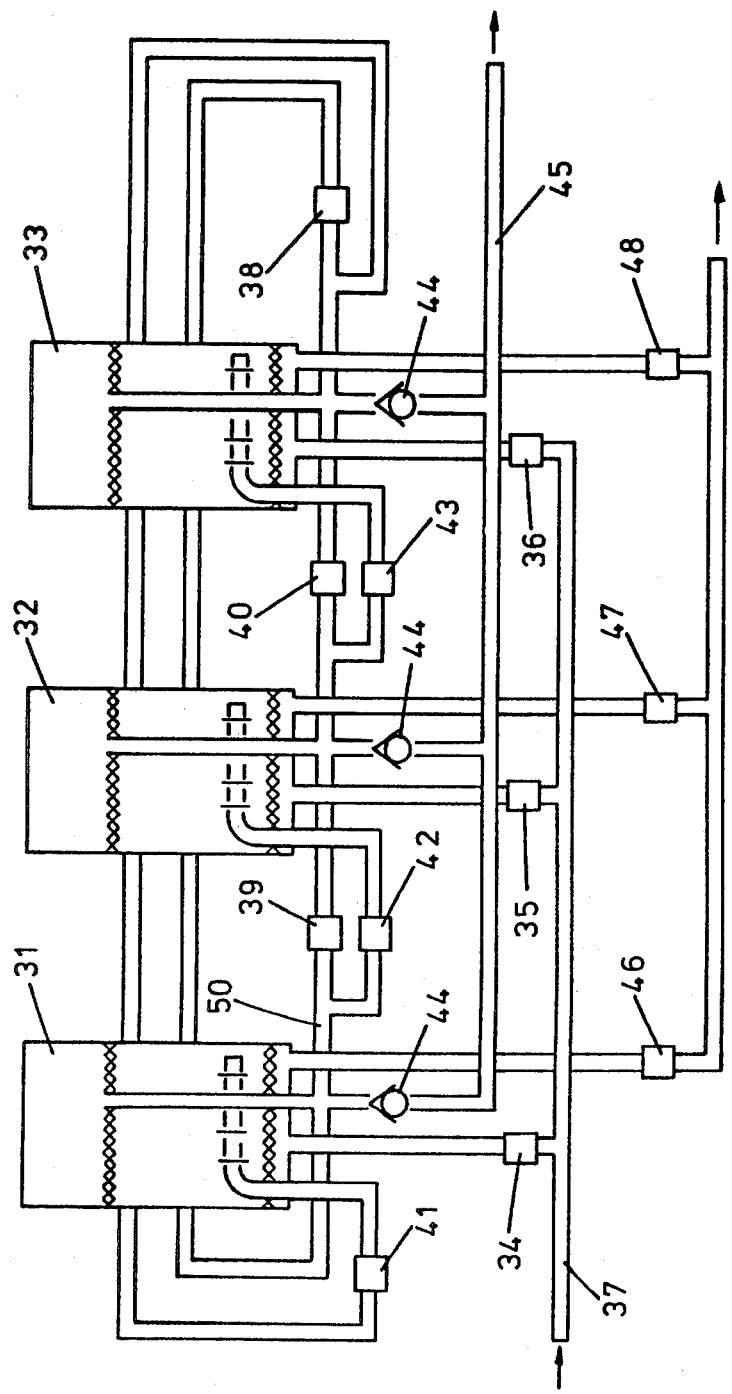
FIG. 2 is a schematic representation of another embodiment of a pressure savings gas separation system, including three sieve beds.

FIG. 2 illustrates an embodiment having three sieve beds 31, 32, 33, respectively, and in which the functions of the control valves 15 and 25 of the embodiment of FIG. 1 are provided by a series of individual flow control valves, that is to say inlet valves 34, 35 and 36 respectively controlling the supply of pressurised air from a supply line 37; purge valves 38, 39, 40 and cross-feed valves 41, 42 43 controlling the flow of product gas for flushing and initial pressurising purposes and, via non-return valves 44, feeding to a product gas delivery line 45; and vent valves 46, 47 and 48.

Upstream of their respective non-return valves 44, the product gas outlet of the three beds 31, 32 and 33 are connected to a ring main 50 incorporating the purge valves 38, 39, 40 and from which the cross-feed valves 41, 42 and 43 can draw product gas from an on-stream bed.

In the operation of the embodiment shown in FIG. 2, compressed air is admitted cyclically to the beds 31, 32 and 33 under the control of the respective inlet valves 34, 35 and 36. When a bed is on-stream, oxygen-rich product gas leaves the bed through the associated non-return valve 44 to flow to the product delivery line 45 that may if desired be associated with a suitable storage reservoir.

The beds are regenerated and placed on-stream in overlapping sequence. Thus when the bed 31 is on-stream, the bed 32 is being readied for placing on-stream while the bed 33 is being regenerated.

When bed 31 is on-stream, the inlet valve 34 is open and the purge valves 38 and 39 are closed, whereas the cross-feed valve 42 is opened to allow some of the product gas from the bed 31 to flow into the bed 32 to bring this up to pressure preparatory to the bed 32 being placed on-stream.

When bed 31 is to be taken off-stream for regeneration, its inlet valve 34 is closed as is also the cross-feed valve 42. The associated vent valve 46 is then opened to depressurise the bed.

Meantime the inlet valve 35 for the bed 32 is opened to place the bed 32 on-stream.

When the bed 32 is on-stream and delivering product gas, the purge valve 39 is opened to direct some of this product gas to the product gas outlet of the bed 31 so that the latter is back-flushed and thereby regenerated.

When the regeneration of the bed 31 has proceeded to the required extent, the vent valve 46 and the purge valve 39 are closed, simultaneously, following which the cross-feed valve 41 is opened to repressurise the bed ready for when it is next placed on-stream.

In a similar manner the bed 33 is first pressurised by opening of the cross-feed valve 43 and then brought on-stream while the bed 32 is taken off-stream and regenerated.

The oxygen partial pressure of the product gas is monitored in similar manner to the monitoring of the product gas of the embodiment of FIG. 1. That is to say, a suitable oxygen partial pressure sensor samples the product gas delivered to line 45 and controls the regeneration of the sieve beds primarily by controlling the periods for which their respective vent valves are open during the regeneration sequence. Additional control of regeneration is applied by regulation of the relevant purge valves.

Some or all of the various flow control valves of the system illustrated in FIG. 2 may be pneumatically operated like the control valve 25 of the system of FIG. 1. However, it is preferred that all the valves shall be electrically operated under the control, conveniently, of a microprocessor responsive to input signals from not only the product gas oxygen partial pressure sensor but also from other sensors responding to conditions that modify or anticipate the required oxygen partial pressure of the product gas.

Thus, for instance, in a system designed to provide a breathable gas supply for aircrew in a pressurised cabin, a control system based upon a microprocessor may take account of any or all of the following parameters:

Air pressure supply to the beds;
Product gas pressure;
Cabin pressure (altitude);
Aircraft altitude;
Product gas flow rate (demand);
Rate of climb of cabin;
Rate of climb of aircraft;
Airspeed;
Standby oxygen supply status;

in addition to responding to the partial pressure of oxygen in the product gas.

Moreover, a microprocessor-based control system can incorporate self-test facilities as well as providing for signalling of its operational status and the operational status of the sieving system that it controls.

A gas separation system in accordance with the invention adapted to produce breathable gas for aircrew can be utilised in conjunction with a very simple demand valve supplying gas on demand only. The usual requirements for safety pressure and pressure breathing in certain respective operational circumstances can be met without difficulty. By monitoring the rate of climb, changes in required product gas oxygen partial pressure can be anticipated by the control system and suitably accommodated by temporary adjustment of the operating cycle of the separation system. By monitoring airspeed, the control system may discriminate between flight and non-flight conditions and adopt respectively different responses to, e.g. separation system failures under those conditions.

In operation of a gas separation system such as that illustrated in FIG. 2, to produce a breathable gas supply for aircrew, a typical operating cycle would have a duration of 15 seconds, each bed being on stream for an individual (different) period of 8 seconds during this cycle, and being subject to regeneration in the course of the remaining 7 seconds of the cycle.

Figure 3:
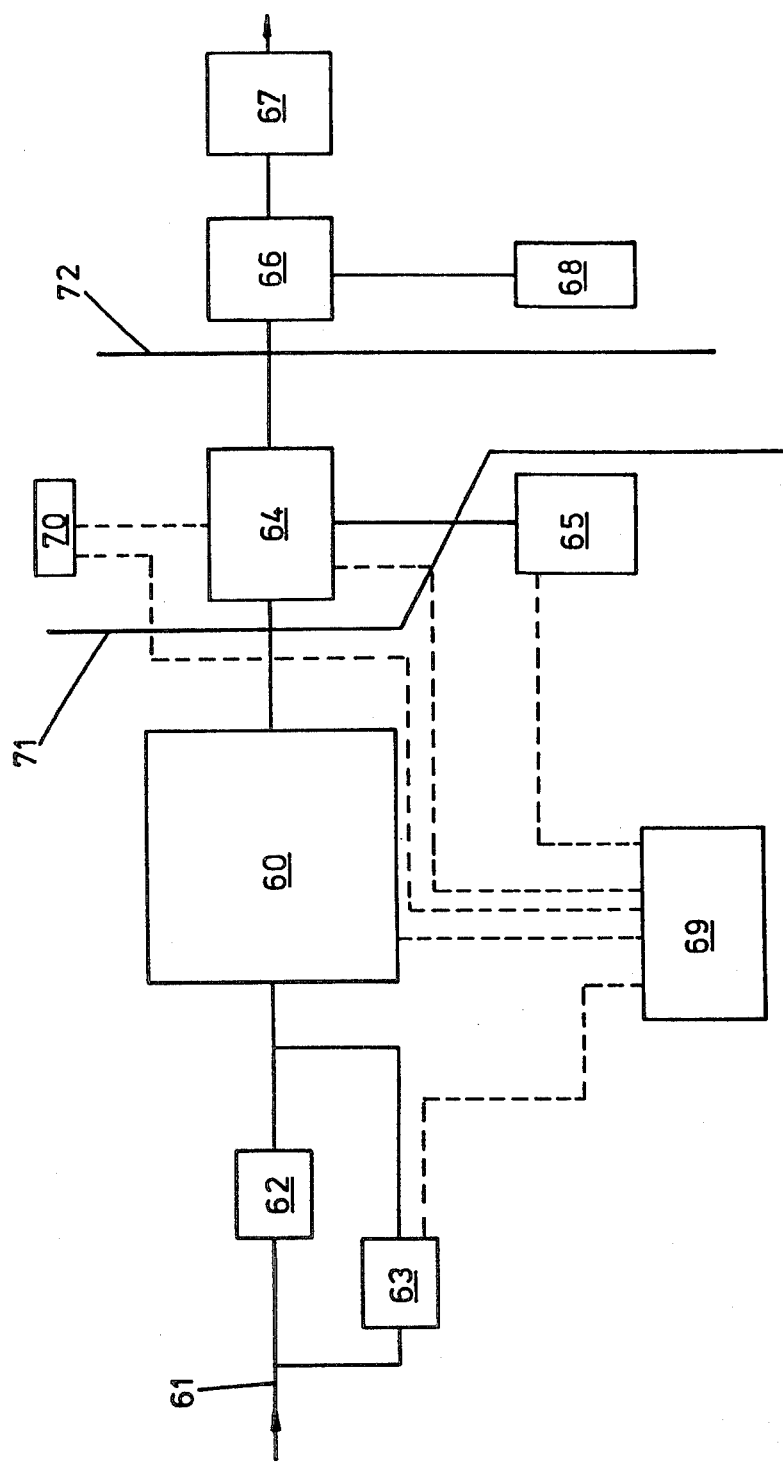
FIG. 3 is a block diagram illustrating the application of the invention to the provision of a breathable gas supply for aircrew.

FIG. 3 illustrates in block diagram from the main components of an aircraft breathable gas supply system based on a pressure sieving gas separation system in accordance with the invention.

In this Figure, the block 60 represents the pressure sieving gas separation system that receives compressed air from a suitable high pressure source represented by line 61, via a pressure reducing valve 62 bridged by a compressor 63 that can be brought into operation when required to boost the pressure from the source to that required for the separation system 60. The separation system 60 delivers product gas to a breathing gas control unit 64 that is also connected to a standby oxygen supply 65 such as a pressure cylinder, and that is in turn connected to deliver a breathable gas to an aircrew member via a personal equipment connector 66 and a demand regulator 67. In the case of an aircrew member working in an ejection seat, the personal equipment connector 66 would be carried by the ejection seat and be associated with an emergency oxygen supply cylinder 68 also carried by the seat for use during bail-out and subsequent descent.

FIG. 3 also shows an electronic control package 69 having electrical control/signal connections (broken lines) to the gas separation system 60, to the compressor 63, to the control unit 64 and to the standby oxygen supply 65, as well as to a switch panel 70 providing for overriding manual control both of the electronic control package 69 and of the control unit 64.

The line 71 on the drawing represents a bulkhead or other division separating an unpressurised zone, such as an equipment bay, to the left of line 71 from a pressurised cockpit or cabin to the right of line 71. It will be seen that the gas separation system 60, the pressure reducing valve 62 and compressor 63, the standby oxygen supply 65 and the electronic control package 69 can all be located in the unpressurised zone. The equipment to the right of the line 72 in the drawing is that which would be provided on an ejection seat installed in the cockpit or cabin.

What is claimed is:

1. A molecular sieve type gas separation system comprising:
    a plurality of interconnected beds containing adsorptive material for retaining at least one constituent of a gaseous mixture supplied to the system to produce a product gas;
    a control means for operating each said bed in a relatively phased cycle having a period of adsorption and a period of regeneration, said control means including
    an inlet valve means for passing the gaseous mixture into each said bed sequentially,
    back-flush valve means for passing a portion of the product gas delivered by an adsorping bed to back-flush another bed for desorption or regeneration of said another bed,
    an adjustable vent valve means for discharging of the back-flushing gas from said another bed, and
    a sensing means for monitoring a physical paramenter of the system gases and for precisely controlling said vent valve means to adjustably regulate the regenerating gas flow therethrough and hence the advance of the retained constituent in said another bed during regeneration thereof so that when said another bed is in a period of adsorption a product gas having an average concentration level of a chosen value is produced and only that amount of product gas necessary to back-flush said another bed for the desired position of the retained constituent is lost during regenerating of said another bed.

2. A gas separation system according to claim 1 wherein the physical parameter monitored by said sensing means is the concentration level in the product gas.

3. A gas separation system according to claim 2, including control means responsive to individual variations in a plurality of sensed conditions affecting the required composition of the product gas.

4. A gas separation system according to claim 3, wherein said control means include a microprocessor.

5. A gas separation system according to claim 2, adapted to produce breathable gas having a selected variable oxygen concentration.

* * * * *